July 2, 1940.　　　　　J. J. DUNN　　　　　2,206,166
PIPE OR TUBE JOINT
Filed Jan. 21, 1938
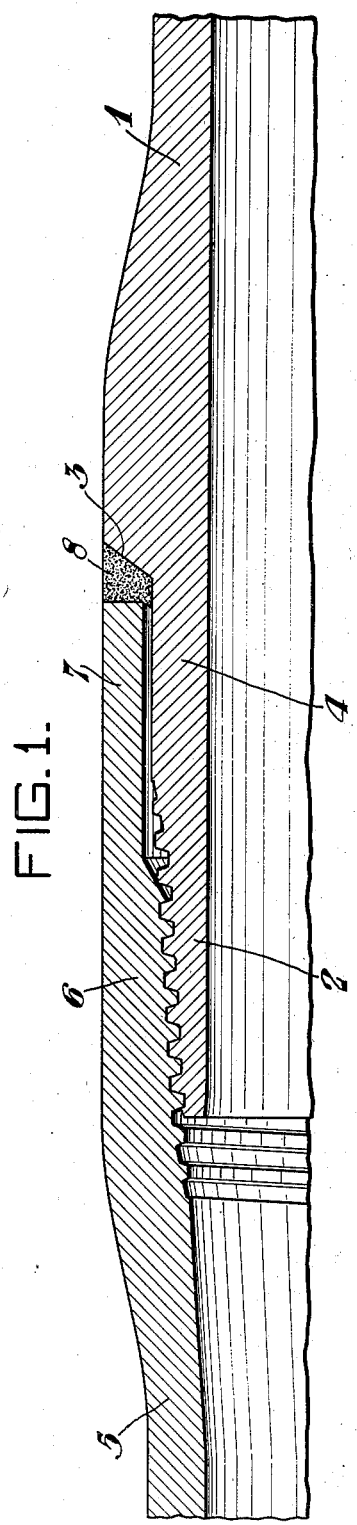
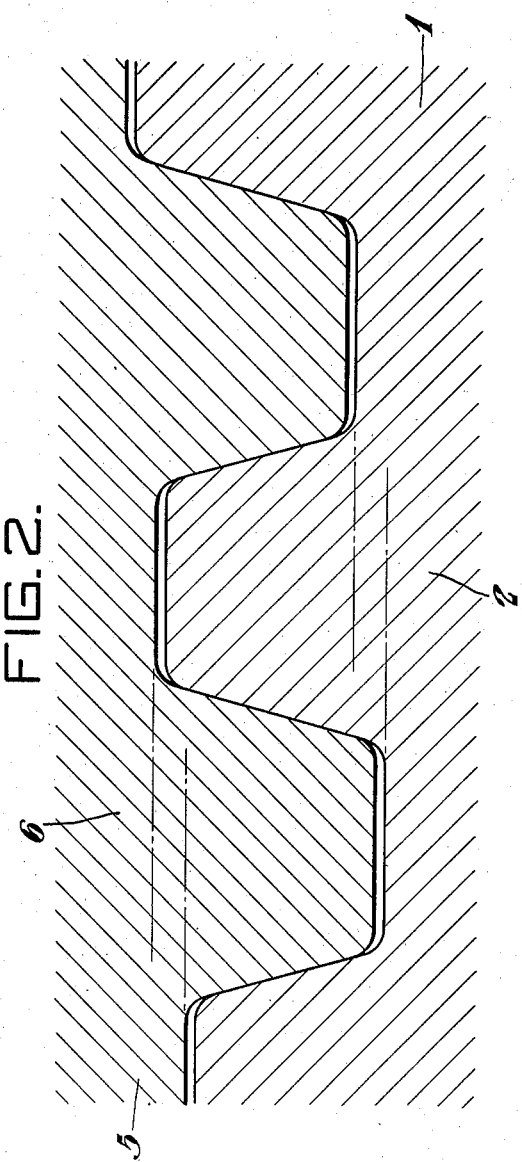
Inventor:
JERRY JAY DUNN,
by: Usina & Lauber
his Attorneys.

Patented July 2, 1940

2,206,166

UNITED STATES PATENT OFFICE 2,206,166

PIPE OR TUBE JOINT

Jerry Jay Dunn, Ellwood City, Pa., assignor to National Tube Company, a corporation of New Jersey Application January 21, 1938, Serial No. 186,207

2 Claims. (Cl. 285—146)

This invention relates to pipe or tube joints in general but is particularly concerned with well-casing joints which must carry considerable tension. One of the objects of the present inventor is to provide a joint capable of being safely stressed in tension with a force equaling, or at least closely approximating, the tensile strength of the casing itself.

A specific example of a joint embodying the features of the invention is disclosed by the accompanying drawing, in which:

Figure 1 is a longitudinal section through one wall of the joint; and,

Figure 2 is an enlargement of the threads shown by Figure 1.

More specifically, this joint includes a male part 1 having a threaded tapered end portion 2 and an outer shoulder 3 spaced from the inner termination of this end portion. A cylindrical portion 4 is interposed between the portion 2 and the shoulder 3.

The other part of the joint is a female part 5 having a threaded tapered portion 6 engaging the portion 2 of the male part 1 and an end portion 7 extending to adjacently opposed relationship with the shoulder 3. Due to this relationship, a circumferential groove is provided and weld metal 8 is deposited in this groove so as to weld the end portion 7 to the shoulder 3.

Inside the diameter of the male part, 1 equals the inside diameter of the casing. The thicknesses of the end portion 7 of the female part and of the portion 4 of the male part are proportioned to distribute tension at the joint through the threaded portions 2 and 6, and the welded parts 3 and 7, in proportion to their relative tensile strengths. Therefore, even though the ultimate strength of either type of interfastening is insufficient to carry the applied tension, this being a condition which might be met in wells of extreme depth, the joint will not fail, due to the fact that each type of interfastening carries a proportionate share of the stress.

It will be noted that the threads are fashioned so that only their sides interengage. This assures tightness when the parts are screwed together. Since the weld carries a share of the tension, the wedging action of the threads will not be sufficient at any time to spring the threaded parts.

I claim:

1. A pipe or tube joint comprising a male part having a threaded end portion and an outer shoulder spaced a substantial distance from the termination of the threads of said end portion, and a female part having a threaded portion engaging said threaded end portion of said male part and having an end portion with a wall of reduced thickness extending to adjacently opposed relationship with said shoulder and welded to the latter, said end portion with said wall of reduced thickness acting to distribute tension through both said threaded and welded parts when said joint is tensioned.

2. A pipe or tube joint comprising a male part having a threaded end portion and a female part having a threaded portion engaging said threaded end portion of said male part and having an end portion with a wall of reduced thickness extending for a substantial distance beyond the end of the threads of said threaded end portion of said male part with its end welded to the latter, said end portion with said wall of reduced thickness acting to distribute tension through both said threaded and welded parts when said joint is tensioned.

JERRY JAY DUNN.